United States Patent
Polyakov et al.

(10) Patent No.: US 9,584,765 B2
(45) Date of Patent: Feb. 28, 2017

(54) REAL-TIME VISUAL CUSTOMER SUPPORT ENABLEMENT SYSTEM AND METHOD

(71) Applicants: Aleksey Polyakov, Philadelphia, PA (US); Oleksandr Shestakov, Philadelphia, PA (US)

(72) Inventors: Aleksey Polyakov, Philadelphia, PA (US); Oleksandr Shestakov, Philadelphia, PA (US)

(73) Assignee: Livegenic Inc., Philadelphia, PA (US)

(*) Notice: Subject to any disclaimer, the term of this patent is extended or adjusted under 35 U.S.C. 154(b) by 0 days.

(21) Appl. No.: 15/012,989

(22) Filed: Feb. 2, 2016

(65) Prior Publication Data

US 2016/0173825 A1 Jun. 16, 2016

Related U.S. Application Data

(63) Continuation-in-part of application No. 14/880,945, filed on Oct. 12, 2015, now abandoned.

(60) Provisional application No. 62/066,878, filed on Oct. 21, 2014, provisional application No. 62/067,974, filed on Oct. 23, 2014.

(51) Int. Cl.
*H04N 7/14* (2006.01)
*H04N 7/15* (2006.01)
*H04L 29/06* (2006.01)

(52) U.S. Cl.
CPC .......... *H04N 7/155* (2013.01); *H04L 65/1076* (2013.01); *H04L 65/602* (2013.01); *H04N 7/147* (2013.01); *H04N 7/152* (2013.01)

(58) Field of Classification Search
CPC .. H04N 7/147; H04N 1/00302; H04N 1/3271; H04N 2007/145
USPC ............................................ 348/14.02, 14.06
See application file for complete search history.

(56) References Cited

U.S. PATENT DOCUMENTS

| | | | |
|---|---|---|---|
| 6,564,380 B1 | 5/2003 | Murphy | |
| 7,610,210 B2 | 10/2009 | Helitzer | |
| 7,961,212 B2* | 6/2011 | Woodworth | H04L 12/587 348/14.01 |
| 8,019,815 B2 | 9/2011 | Keener | |
| 8,712,893 B1* | 4/2014 | Brandmaier | G06F 17/3028 705/35 |
| 8,830,291 B2 | 9/2014 | Kay | |
| 8,848,027 B2 | 9/2014 | DeLand | |
| 2008/0291905 A1* | 11/2008 | Chakravadhanula | H04L 29/06027 370/355 |
| 2009/0019176 A1 | 1/2009 | Debrosse | |
| 2011/0098021 A1* | 4/2011 | Shaw | H04M 1/72572 455/412.2 |

(Continued)

FOREIGN PATENT DOCUMENTS

| | | |
|---|---|---|
| CA | 2387638 A1 | 5/2001 |
| CN | 101964850 A | 2/2011 |

*Primary Examiner* — Stella Woo
(74) *Attorney, Agent, or Firm* — Steinberg Intellectual Property Law LLC; Gloria M. Steinberg, Esq.

(57) ABSTRACT

Disclosed is a system and method for providing real-time visual customer support. In one embodiment, the present system is configured to enhance native phone communication by simultaneously being able to deliver one-way real-time visual streaming from the end consumer. In this way, the present invention allows businesses to participate in collaborative audio-visual communication during the very first customer contact over the phone.

20 Claims, 13 Drawing Sheets

(56) References Cited

U.S. PATENT DOCUMENTS

| | | | |
|---|---|---|---|
| 2013/0074141 A1* | 3/2013 | Hwang | H04N 21/242 |
| | | | 725/116 |
| 2013/0297353 A1 | 11/2013 | Strange | |
| 2014/0057590 A1* | 2/2014 | Romero | H04W 4/22 |
| | | | 455/404.2 |
| 2014/0095637 A1* | 4/2014 | Cropper | H04L 67/22 |
| | | | 709/206 |
| 2014/0320590 A1* | 10/2014 | Laurentino | H04N 7/155 |
| | | | 348/14.08 |
| 2015/0022617 A1 | 1/2015 | Le | |
| 2015/0049164 A1* | 2/2015 | Krishnamoorthy | H04N 7/147 |
| | | | 348/14.11 |
| 2015/0293996 A1* | 10/2015 | Liu | G06F 17/30823 |
| | | | 707/723 |

* cited by examiner

REAL-TIME VISUAL CUSTOMER SUPPORT ENABLEMENT SYSTEM AND METHOD

CROSS-REFERENCE TO RELATED APPLICATIONS

This application is a continuation-in-part of application Ser. No. 14/880,945, filed Oct. 12, 2015, that is incorporated by reference in its entirety. application Ser. No. 14/880,945 claims the benefit of U.S. Provisional Patent Application No. 62/066,878, filed Oct. 21, 2014, and U.S. Provisional Patent Application No. 62/067,974, filed Oct. 23, 2014, which are hereby incorporated by reference in their entirety.

FIELD OF THE INVENTION

The present invention generally relates to a real-time communication system and method of use. More particularly, the present invention is directed to a system and method for identifying, connecting, collecting, and distributing numerous mobile real-time communication mediums into a uniform communication channel as well as separating and routing a single communication medium into numerous communication channels.

BACKGROUND OF THE INVENTION

Overwhelming majority of all customer communications occur over the phone. Despite the increasing presence of social media and online customer service tools, the nature of this paradigm is that voice communications are the most direct interactive communications that exist. While it is convenient to use the phone, verbal communications over the phone often fall short of enabling the listener to adequately understand, diagnose, triage, and resolve the issues. In this regard, verbal communications have the apparent lack of clarity, which makes customer service support extremely expensive while frustrating to many.

Over the past few years, there has been an increase in a number of video conferencing and video chat solutions on the market. Modern real-time video communications systems fuse audio and video data into a uniform medium that combines the voice and the video channels together. In web conferencing, the video and the audio travel together and the video frames are synchronized for optimal quality teleconferencing interaction, creating a uniform transmission of communication.

Combining voice communication with visual communication, and in particular, real-time video, makes the communication simpler, easy, and productive while increasing the quality of a customer service experience. Phone conversations, whether coming from a mobile device or a landline do not have a way to deliver a visual stream to the conversation. Generally, existing video conferencing systems, e.g., Skype, require participants to be connected to each other prior to commencing a conversation. Another video conferencing system, FaceTime, is limited for use on certain devices, namely, Apple devices. Furthermore, existing systems and methods for conducting real-time video transfer or live streaming rely heavily on network connectivity. In this regard, live video streaming is very sensitive to the network bandwidth capacity, and quality of the video can suffer depending on the bandwidth and the size of the video resolution. Thus, videos must be recorded and then uploaded at a later time if network connectivity is not available or unreliable.

In addition, all of the existing systems require the participants to install software on their electronic devices in order to start communicating. For example, to communicate over Skype, all parties in communication must first install the Skype application before calling. Similarly, to communicate over FaceTime, both parties must have an Apple device with the FaceTime application pre-installed. In this regard, existing systems require an initial set up process to configure an end user to become a conversation participant and acquire a visual communication. More specifically, the end user, i.e., a customer, would have to call a customer support hotline, connect to a customer service support agent, hang up the phone, install appropriate software, and then re-connect with another customer service support agent through a separate system, e.g., via the installed software. Alternatively, the end user must have a pre-recorded video and transmit it to the customer service support agent via a secondary platform such as a website for sharing videos.

The examples above illustrate that there have been limited means to enhance a phone conversation with a real-time visual channel. Applying these concepts to help desk support and/or customer service environments, field operations, etc. and then fitting them within a business workflow, creates a need for a real-time video centric customer service support help system that allows customer service support agents, or business employees, to connect to real-time visual streams coming from the mobile devices of their customers and other employees.

The present invention provides a system that combines ad-hoc real-time visual streaming functionality into a centralized hub of customer service interaction or a field operation management enterprise platform. The system includes unique algorithms for identifying participants of the communication channels using mobile device metadata and the way they connect to the other parties, and re-routing of the audio channel for uniform processing. This innovative invention not only addresses the dynamic ability to provide the visual without disconnecting from the phone, but also provides solutions to tackle on-demand distribution of the application, while the end user or the customer is connected over the phone.

SUMMARY OF THE INVENTION

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as to prelude to the more detailed description that is disclosed later.

In preferred embodiments, the present real-time video centric system may be applied to help desk support and/or customer service environments, field operations, and claim and insurance industry. In one embodiment, the present invention enables real-time visual streaming from a customer during the very first contact over the phone. This process is ideal in the areas of customer service and support environment as well as in the internal business environments that employ a field communication support team such as a dispatch, hotline, or a command center.

In operation, a customer service support agent, upon receiving a phone call from a customer, can supply a link to the customer to download and install a mobile application or push the mobile application to the customer's device, e.g., a smart phone, directly. Once the application is installed, the customer can commence live streaming video from the customer's mobile device camera. This installation of the application and the streaming is conducted while the customer remains connected verbally over the phone with the customer service support agent. When the customer starts streaming, the customer service support agent can immediately view everything that the customer records with the mobile device camera. In another embodiment, if the customer connected over a landline, the customer has the capability of employing a separate, secondary device to provide the visual while being able to continue communicating verbally over the landline phone.

When the video capturing functionality, or more particularly, when live streaming is activated, a high-definition version of the video is supplied and temporarily stored on the customer's device. Thereafter, the high-definition version of the video is automatically deleted from the customer's device once the video is synchronized and uploaded to the customer service support agent or another receiving entity. If the present system encounters an error in the visual streaming and the customer is unable to provide a live video due to limited or variable connectivity, the customer remains connected with the customer over the phone line. By maintaining the connection over the native phone, the present invention allows the business to utilize the existing customer service call center platform for recording the conversation for quality control, and for tracking customer service metrics, e.g., average hang-time, first call resolution. In contrast, communicating only over a web conference platform would disable businesses from collecting customer service metrics, unless the web conference platform is specially equipped with these capabilities in its own platform.

In another embodiment, the present system provides access to remote assistance to field operations. By delivering a set of mobile real-time visual solutions, the present system allows users within the construction space to triage, make decisions, and synchronize operation in a transparent manner within the field. In this way, the present system can overcome the challenges that include marrying the manpower, equipment, and schedules together into a synchronous optimal operation.

In another embodiment, the present system provides remote damage assessment solutions within claims and insurance industries by improving customer support and collecting evidence during the first notice of loss. The system enables claim adjusters to quickly and easily acquire a visual from the customer's point of view. In this way, insurance carriers can benefit from effective triage and handle claims completely remotely. In addition, these capabilities enable improved risk assessment with timely evidence caption and fraud prevention metadata.

It is therefore an object of the present invention to provide a system that enhances phone communications with live video to clarify the information exchange and to lead to quick issue resolution for customers and customer service support agents.

It is another object of the present invention to apply real-time visual streaming into the business process during the very first contact with a customer to lower the costs of support, shipment and replacements, and customer attrition.

It is another object of the present invention to provide dynamically adaptable recording capabilities and approaches to deliver high quality video artifacts into a cloud environment by detecting the type of artifact transfer the system should select.

It is another object of the present invention to provide a method that can maintain a high quality customer service and support with minimal barriers in communication efficiency.

It is another object of the present invention to provide a system that can be used by insurance carriers to provide effective triage and to handle insurance claims remotely.

It is still another object of the present invention to provide a set of mobile real-time visual solutions to bring the triage, decision making, and transparency necessary for a dynamic, fast pace environment in field operations.

It is still another object of the present invention to provide a system that connects one or more viewers of a live video feed to a one-way video of one or more real-time streams delivered from the hands of other parties while simultaneously communicating verbally over a third party audio line.

It is still another object of the present invention to provide a system that maintains a conversation over the phone while establishing and providing a video communication to allow a business to utilize an existing customer service call center platform for recording the conversation for quality control and for tracking customer service metrics.

In the light of the foregoing, these and other objects are accomplished in accordance of the principles of the present invention, wherein the novelty of the present invention will become apparent from the following detailed description and appended claims.

BRIEF DESCRIPTION OF THE DRAWINGS

The above and other objects and advantages of the present invention will be apparent upon consideration of the following detailed description, taken in conjunction with the accompanying exemplary drawings, in which like reference characters refer to like parts throughout, and in which.

DETAILED DESCRIPTION OF THE INVENTION

The present invention is directed towards a real-time visual customer support enablement system and method of use. For purposes of clarity, and not by way of limitation, illustrative views of the present system and method are described with references made to the above-identified figures. Various modifications obvious to one skilled in the art are deemed to be within the spirit and scope of the present invention.

As used in this application, the terms "component," "module," "system," "interface," or the like are generally intended to refer to a computer-related entity, either hardware or a combination of hardware and software. For example, a component can be, but is not limited to being, a process running on a processor, an object, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or." Additionally, the articles "a" and "an" as used in this application and the appended claims should generally be construed to mean "one or more" or "at least one" unless specified otherwise or clear from context to be directed to a singular form. It is to be appreciated that determinations or inferences referenced throughout the subject specification can be practiced through the use of artificial intelligence techniques.

Figure 1:
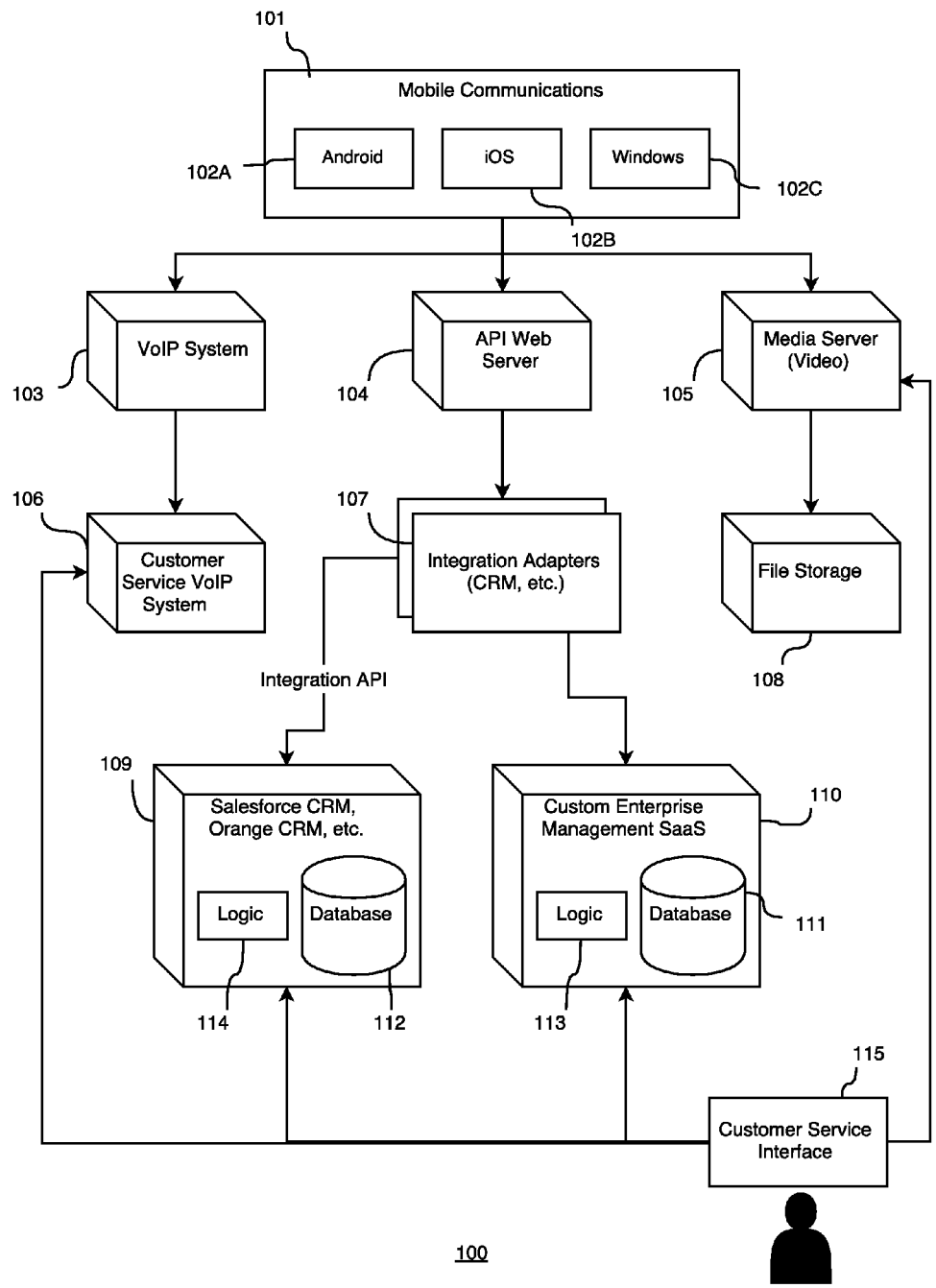
FIGS. 1 through 3 show block diagrams of the enterprise client management portal with visual data connectivity.
Figure 2:
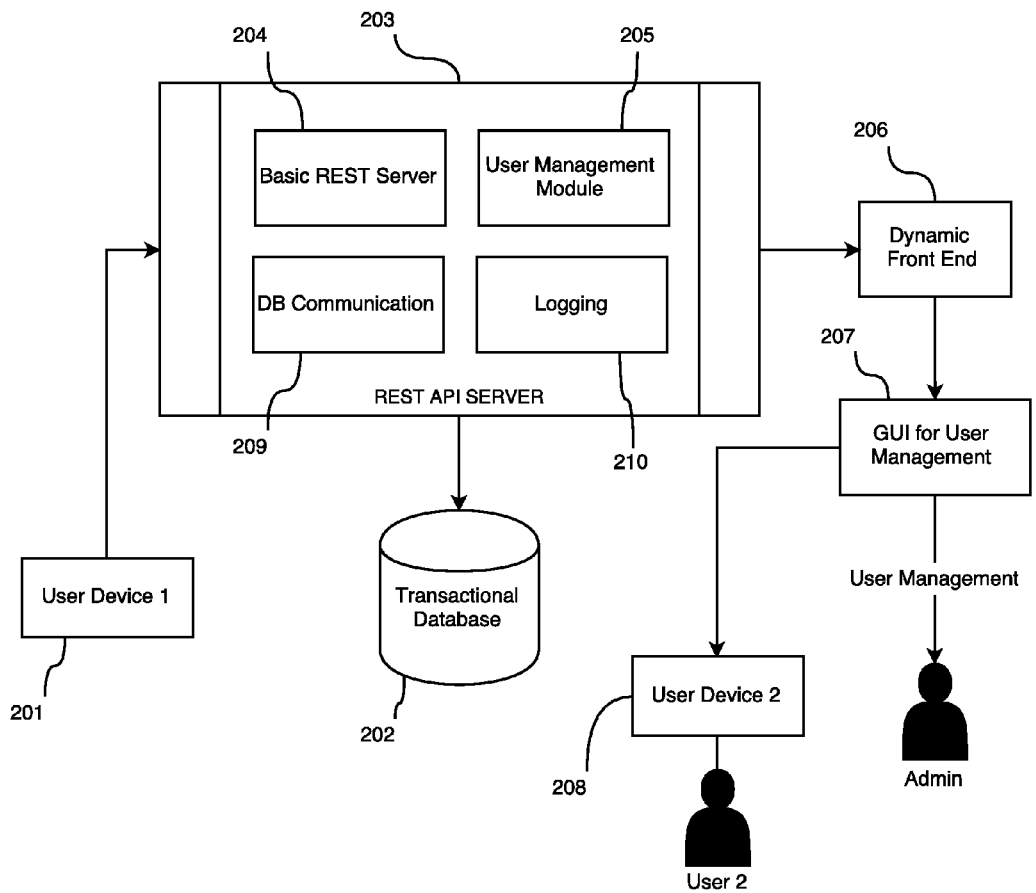
Figure 3:
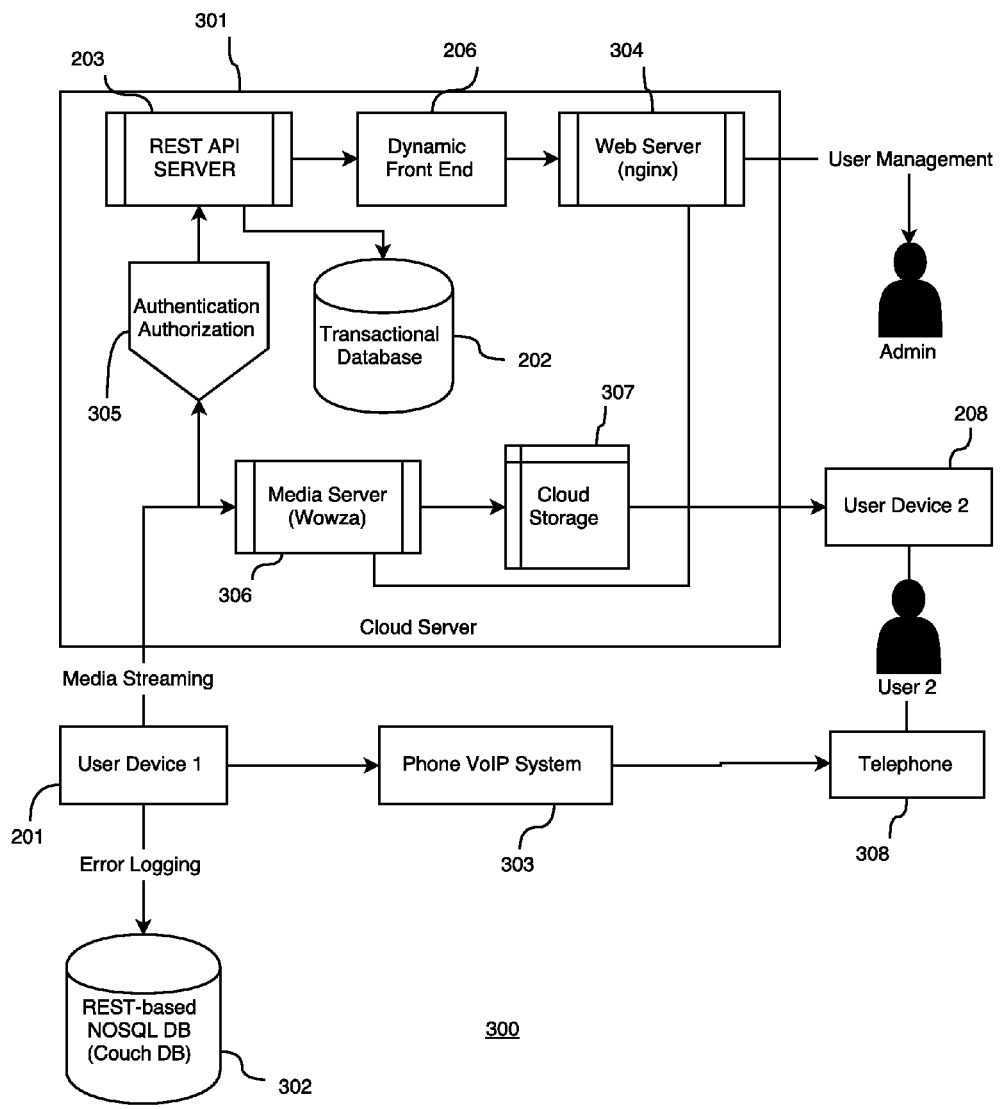

Referring now to FIGS. 1 through 3, there are shown block diagrams 100, 200, 300 of the enterprise client management portal with visual data connectivity. The present invention comprises a delivery and streaming infrastructure, an online and nearline video archive, back end and API server 104, and front end server components. The delivery and streaming infrastructure includes a mobile communication library with streaming encoders and at least one media streaming server 105. Without limitation, the mobile communication library with streaming encoders is configured to: establish support sessions and manage the support session's identity and security; capture and encode video streams; capturing high-resolution pictures; capture bookmarks, notes, geo-location and other types of relevant customer information; and transfer data to encoder media server 105.

The media streaming server 105 is configured to process live video streams and complimentary customer information. Without limitation, the media streaming server is configured to retrieve incoming video streams, encode streams in formats with high, medium or low bitrates, and transfer to an output stream; record incoming video streams and store the same in the video archive; manage incoming streams authentication and authorization, video streams queue processing.

The online and nearline video archive is a combination of the server attached storage, cloud online storage, and cloud nearline storage. The online and nearline video archive is configured to: establish low-latency replicated storage and retrieval to and from the server-attached storage; establish low-latency replicated distributed storage and retrieval to and from the cloud online storage; and establish replicated distributed storage and retrieval to and from the nearline storage archive.

The back end and API server 104 is a server side system for enabling storage and workflow management. The back end and API Server is configured to: conduct user management, security, registrations, authentication, authorization, audit, access management; API for integration and interconnection with mobile and cloud applications; metadata storage and management in relational and NoSQL databases; workflow management, registration, processing and backing up media content.

The front end server comprises a server side system that establishes direct user interactions via a web browser. The front end server is configured to: collect and visualize user information; manage metadata; play media content via the web browser; and provide integration widgets for incorporation into third party websites.

The illustrated embodiments further include mobile devices with mobile communications 101 capabilities that can include various operating systems such as Android 102A, iOS 102B, Windows 102C. The mobile communications 101 is in communication with a VoIP system 103 or other suitable messaging framework, an API web server 104, and a media server 105, wherein the media server is connected to a file storage unit 108.

The VoIP system 103 further communicates with a customer service VoIP system 106. The present system utilizes VoIP routing in order to connect with the user of the mobile application, i.e., the visual stream provider, for real-time streaming. When the phone connection is disconnected, the viewer of the real-time stream is also disconnected. This event instructs the server to reconnect with the real-time visual streaming application that was previously identified via a unique stream identifier. A call back mechanism will route and launch a VoIP call from within the mobile application, thereby reconnecting the customer service support agent and the customer.

The present invention also allows a user, e.g., a customer service agent to manually switch from a phone conversation to a VoIP conversation. When this switch takes place, all streaming communications, voice and video will travel through the mobile application, although they may or may not be embedded to travel in the same channel.

When the streaming is in operation within the application, the user device may be configured to: automatically activate and deactivate the device's speaker phone for audio if there are no headsets detected; and channel detected audio with the video if the phone function is not being utilized when the streaming starts. In some embodiments, the video can be shared with or without the audio, as the audio captured through the phone lines can be removed or re-added for replay per organization's privacy rules and regulations.

The API web server 104 is in communication with at least one integration adapter 107, e.g., customer relationship management (CRM), which is in connection to other types of CRM 109 such as Salesforce CRM, and Orange CRM via integration API. Each of the CRM 109 includes business logic 114 and a database 112.

The integration adapters 107 are also in connection to a custom enterprise management SaaS 110, which contain a business logic 113 and a database 111. Each of the customer service VoIP system 106, the CRM 109, the customer enterprise management SaaS 110, and the media server 105 receives data from a customer service interface 115. It is contemplated that the customer service interface 115 is accessible by a viewer of a visual stream, e.g., a customer service agent (CSA), an insurance claims handler or adjuster, a customer, and other end users. The customer service interface 115 comprises a graphic user interface (GUI) for displaying videos thereon. Additionally, the customer service interface 115 comprises menus and dashboard for selecting various settings and options.

In another embodiment, the present system comprises a first user device 201 that is operated by a first end user, wherein the first end user provides visual streaming. Without limitation, the user device comprises a computer, a smart phone, a mobile device, a personal digital assistant (PDA), an e-reader, or other types of data-enabled devices that can connect to a network such as the Internet, local area network (LAN), Wifi, and the like.

The first user device 201 comprises the mobile application with stream encoders installed thereon. The mobile application is configured to supply real-time visual stream while providing connectivity and routing voice and video to the connected parties. The first user device 201 is connected to a REST API server 203 comprising a basic REST server 204, a user management module 205, a database communication module 209, and a logging module 210. The server 203 communicates with a transactional database 202 and a dynamic front end 206, which transmits data to a GUI for user management 207. The GUI for user management 207 is accessible by an administrative entity and a second end user via a second user device 208. It is contemplated that the second end user views the visual streaming provided by the first end user.

In another embodiment, the first user device 201 is in communication with a cloud server 301 via media streaming. The cloud server 301 includes a media server 306 that transmits data to a cloud storage and archive 307, which in turn pushes data to the second user device 208 that is operated by the second user. The cloud server 301 further comprises an authentication and authorization module that communicates with the REST API server 203. As discussed above, the REST API server 203 is connected to the dynamic front end 206 and the transactional database 202. The dynamic front end 206 pushes data to the web server 304, which connects to the administrative entity. The web server 304 is further connected to the media server 306.

In another embodiment, the first user device 201 is configured to provide dynamically adaptable recording capabilities and deliver high quality video artifacts into the cloud storage 307 by detecting the type of artifact transfer the system should select, i.e., record and upload or live streaming. In this way, the present system can provide a high-definition video without relying on the network bandwidth capacity, among other factors that can compromise the quality of the video.

When the video capturing functionality is activated, the video is automatically recorded on a local device, i.e., the first user device 201, and automatically uploaded by chunk-based transfer into the cloud storage 307. The cloud storage and archive 307 then transmits the video to the second user device 208. When live visual streaming is enabled, a high-definition version of the streaming video is supplied to the first user device 201 and the second user device 208 at the same time so that the first user device 201 temporarily stores the video. Once the visual streaming session concludes, the recorded video is synchronized and uploaded to the cloud, and automatically deleted from the first user device 201 to conserve device storage. Then, the newly arrived artifact, i.e., the recorded video, is used to enhance the original live video content to improve its clarity, content, and overall quality.

In this regard, the present invention provides the best video quality artifact even when the video streaming connectivity suffers from reduced quality due to available bandwidth. The improvement in the quality of the video provides better experience when replaying the video, and reduces frame loss and interruption attributed to various network bandwidth and connectivity issues. The application is also configured to avoid live streaming when there are no viewers detected so as to record and upload the highest quality video artifact.

The user device 201 is also in communication with a telephone 308 that is operated by the second user. On mobile devices that do not allow simultaneous phone and data usage, the enterprise portal provides in-application calling capabilities that call the mobile application of the customer using SIP/VoIP system 303. In this way, the real-time visual streaming can be combined with the audio channel and be supplied to a business' customer support system.

During the phone interaction, the voice travels over the user device 201, e.g., a native phone and leads to a video capture that does not contain the voice. Therefore, to record the voice, an enterprise portal enables call recording capability that dials the customer service support agent's or in-house employee's configured phone number, triggering the ability to conduct a three-way call in a new recording participant line to record the voice communication between two parties.

This type of voice recording is asynchronous, meaning that a full interaction can be recorded independently of video recording, such that the video can be halted and restarted multiple times without causing voice recording to halt or disconnect.

In this type of interaction, the invention still handles voice and video communication asynchronously. Because the same data communication channel, e.g., 3G, 4G, LTE, etc., is now shared by both voice and video, however, an algorithm is applied in order to prioritize an audio channel over a video channel. This algorithm is responsible for maintaining the verbal connection between the participants in the event that the bandwidth or connectivity drops by adapting the video quality or turning the live streaming off. This approach is unique and different from systems such as Skype, FaceTime, or WebRTC protocols where both voice and video travel together and in the event of the bandwidth fluctuation causes a loss of both voice and video channels at the same time.

Since the voice in the platform is handled asynchronously from video communication, the voice channel is connected with real-time speech to text transcription, analytics, fraud detection, and recognition services; and this channel provides business critical notifications to the customer service representative in real-time.

The real-time streaming mobile application installed on the user device 201 allows the user, i.e., the customer, to dial a customer service number directly from the application. More particularly, the application comprises a customizable dashboard that shows various companies' customer service phone numbers, which may be displayed as icons, tiles, or in a list. The customer service numbers can be listed in the order of the customer's preference. If a phone number is not listed, the application allows the user to search directories, i.e., by name, category, location, or manually enter a new phone number. When a new phone number is manually entered, the number is saved for future reference. Additionally, the application logs each customer service calls to create a history of all of the calls. If any error occurs during operation, information and data relating to the error in the session is stored in the REST-based NOSQL database 302, such as a CouchDB database, for analysis at a later time.

To merge audio and video channels for accurate replay, the visual stream and the audio content must be synchronized in order to prevent latencies associated with mobile broadcasting, wherein on average, the latency in real-time visual streaming can range from 0.5 seconds to 10 seconds, while audio latency ranges are within 0.01 seconds to 1 second.

During transmission of the video, the video stream is modified to embed a timestamp within the pixel frames to identify the increments of the video frames. Since the mobile device may not handle the extra processing to modify every frame, leading to burning of extra energy through increased number of CPU cycles, a specific delay interval is defined, marking only some frames that fall within a given increment.

When the visual stream with the audio is combined into a single video with voice, the missing frames that do not suit the interval are added as copies of previous frames to satisfy the latency changes and the differences in time lapses between marked frames. Subsequent passes through the combined video will analyze drastically changing frame rates in the video and add new matching frames into slots that are deviating from the average frame per second rates in order to achieve a balanced video with high quality and a stable visual and audio delivery.

Figure 4:
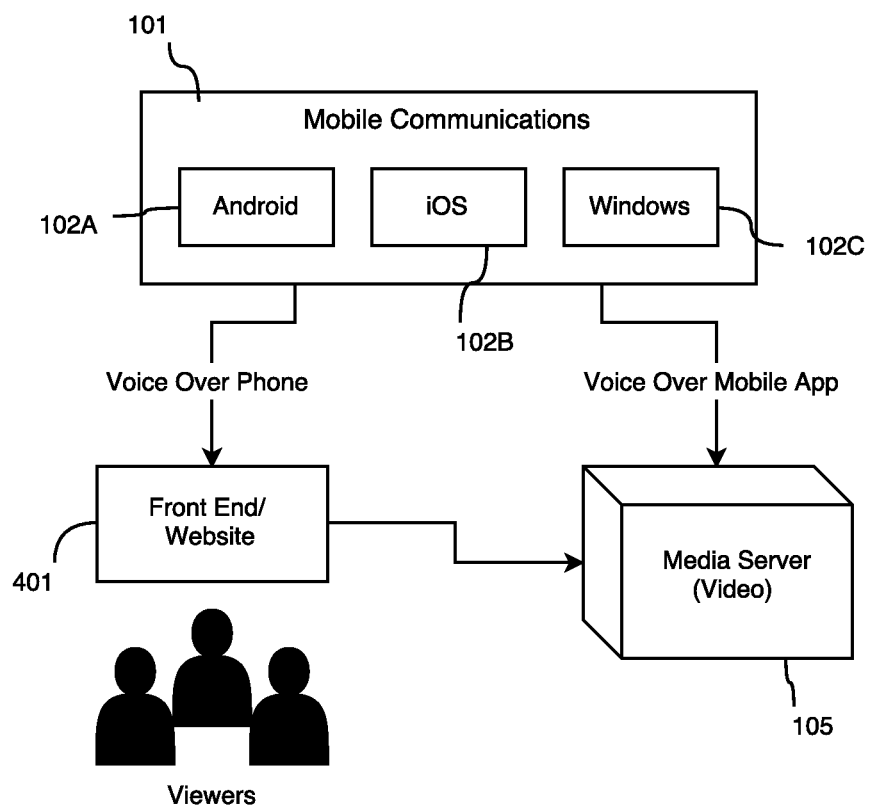
FIG. 4 shows a workflow chart of the real-time video stream identification.

Referring now to FIG. 4 shows a workflow chart of the real-time video stream identification. The present invention comprises mobile devices with mobile communications 101 capabilities that can include various operating systems such as Android 102A, iOS 102B, Windows 102C. The mobile communications 101 is in communication with a front end or a website 401 via voice over phone connection, wherein the front end or the website 401 is accessible to viewers. The mobile communications 101 is also in communication with a media server 105 via voice over mobile application. The front end or the website 401 is also in communication with the media server 105.

Each visual stream can be matched with metadata that is obtained from other visual streams so that additional information such as: position, i.e., latitude and longitude or Global Positioning System (GPS) location of the visual stream; video capturing direction; video resolution; video screen dimensions; hardware and software configuration information of the device used to provide the visual stream; information on the device performance, e.g., frames per second, camera quality; and start and end time of the streaming are obtained.

Figure 5:
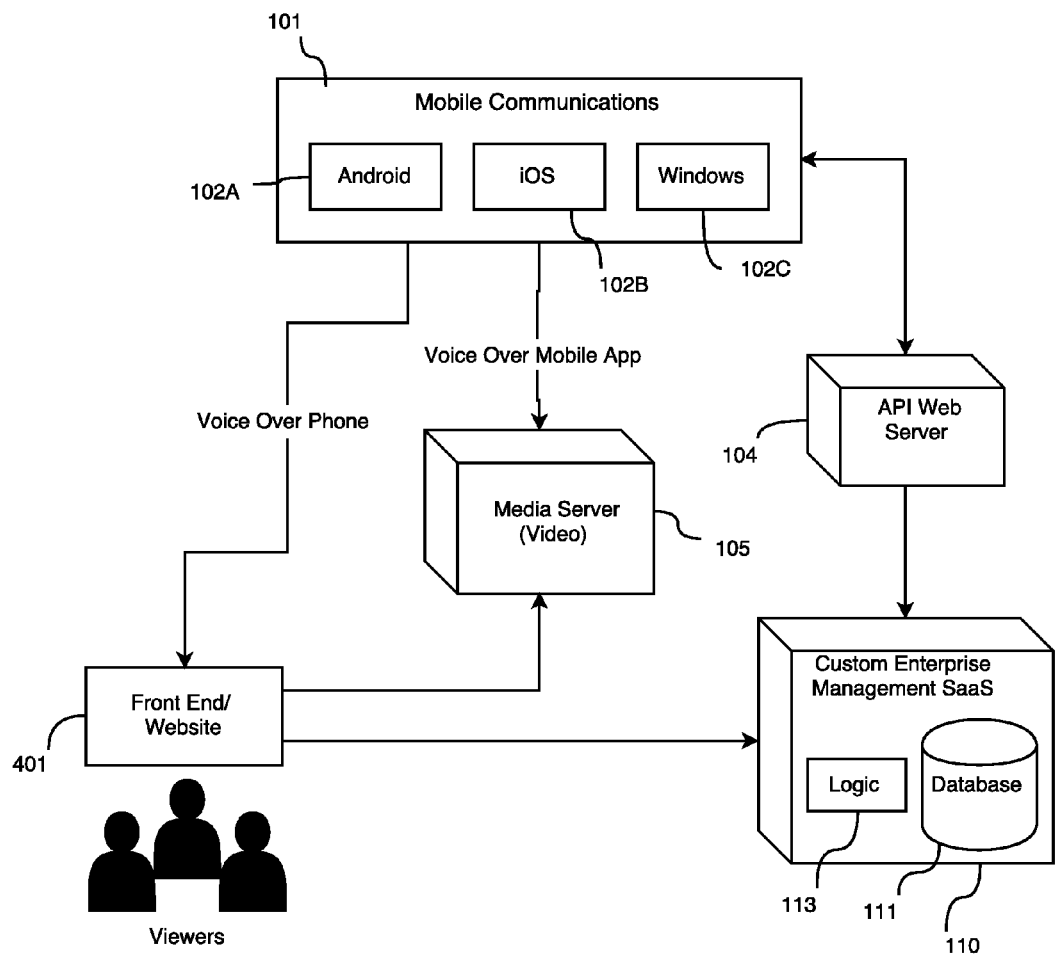
FIG. 5 is a workflow chart of the mobile real-time streaming application.

Referring now to FIG. 5, there is shown a workflow chart of the mobile real-time streaming application. As discussed above, the present invention comprises mobile devices with mobile communications 101 capabilities that can include various operating systems such as Android 102A, iOS 102B, Windows 102C. The mobile communications 101 is in communication with a front end or a website 401 via voice over phone connection, wherein the front end or the website 401 is accessible to viewers. The mobile communications 101 is also in communication with a media server 105 via voice over mobile application. The front end or the website 401 is also in communication with the media server 105.

In the illustrated embodiment, the system further comprises an API web server 104 that is in communication with the mobile communications 101 and a custom enterprise management SaaS 110, which comprises logic 113 and database 111 therein. The front end or the website 401 is in communication with the custom enterprise management SaaS 110. The front end 401 may be configured to allow the viewers to switch real-time visual streams without disconnecting from the currently displayed screen. Additionally, the viewers may watch multiple real-time videos concurrently on a single screen.

In an embodiment where a visual stream provider cannot immediately connect to a viewer, the visual stream provider can provide the viewer with a visual voicemail or a prerecorded video. This embodiment is particularly suitable for handling unmanned customer service inquiries. For example, when a customer submits a visual voicemail or a video, it is listed in a queue for resolution and the customer service support system is provided with a notification of the new incoming voicemail.

The present system also provides a real-time display of GPS coordinates on a map, wherein the map can be displayed on the front end or the website 401. Preferably, the system displays the location of the stream for all GPS-enabled devices. This allows the customer service support agents or dispatch personnel to verify the information based on the mapped coordinates and handle it appropriately. This feature is ideal for use cases revolving around catastrophe handling of major weather events in field operations and claims. As the customers supply more and more information with audio and visual data into the system, the real-time map identifies all of the incoming reports in order to evaluate the severity of the impacted area(s), and allow the business agents or representatives to review the visual evidence as the visual voicemails are coming in; extending timely assistance to the customers based on the information the customers have submitted.

The GPS coordinates is also be used to route the video streaming through the appropriate media streaming server for communications occurring around the globe. This feature ensures high streaming quality by intelligently selecting the appropriate distance-based and quality-based server for communication between a visual stream provider and a viewer. For instance, this feature can be used to connect a mobile streaming user in Europe to a server in Germany, while connecting a mobile streaming user in North American to a server in New York.

Additionally, the system enables the customer service support to sort the voicemail by urgency, subject matter, topic, geographic location, and other factors to resolve matters and conduct analytics. In one embodiment, speech analytics is used to mine audio speech for data. Speech analytics are designed to capture the phonetic combinations, special words, numbers, characters, sounds, tones, vibration, and speed of conversation to identify specific elements such as elements of high frustration or high level of customer satisfaction.

The speech analytics listens for trigger words to mark a specific time frame in a video stream. This is done by evaluating speech, transcribing it into text along with timestamps of text occurrence, and then querying the system to produce all the visual results that correspond to specific triggers. In this way, the present system provides a way for a viewer to associate image(s) with certain words. To expedite such mining process, speech recognition patterns can be applied to the speech analytics in order to mine larger segments of the video stream, thereby allowing the system to analyze a larger volume of video streams in a shorter amount of time.

In addition, the voice recognition events triggered by voice analytics map the video frames with the instant of the voice events in order to provide visual mapping of the contextual verbal data. For example, if a customer says "water," a video frame is identified at that timestamp in order to map the video frame with "water" context and hence enables visual recognition and analytics.

In this regard, the speech analytics of the present system can be used to: define the time range of the video data mined before and after the keyword or speech trigger; generate only the segments of the video or extract video frames that correspond to the word keywords or triggers, rather than full length videos as they may be too long or unnecessary; and apply speech analytical triggers in real-time by cutting segments of live video as the trigger is recognized. The speech analytics can also be used to log historical video trending based on collections of video segments captured through the speech analytic triggers. This involves not only the analysis of the mass trending by multiple different customers but also the analysis based on the sequential capture of visual information from the same customer.

In some embodiments, the speech analytics is configured to notify the viewer when certain trigger words are used. Based on the notifications, the viewer can take appropriate actions. For example, the viewer, e.g., a customer service agent, can flag the video as a high priority item and reorder it in a queue.

Figure 6A:
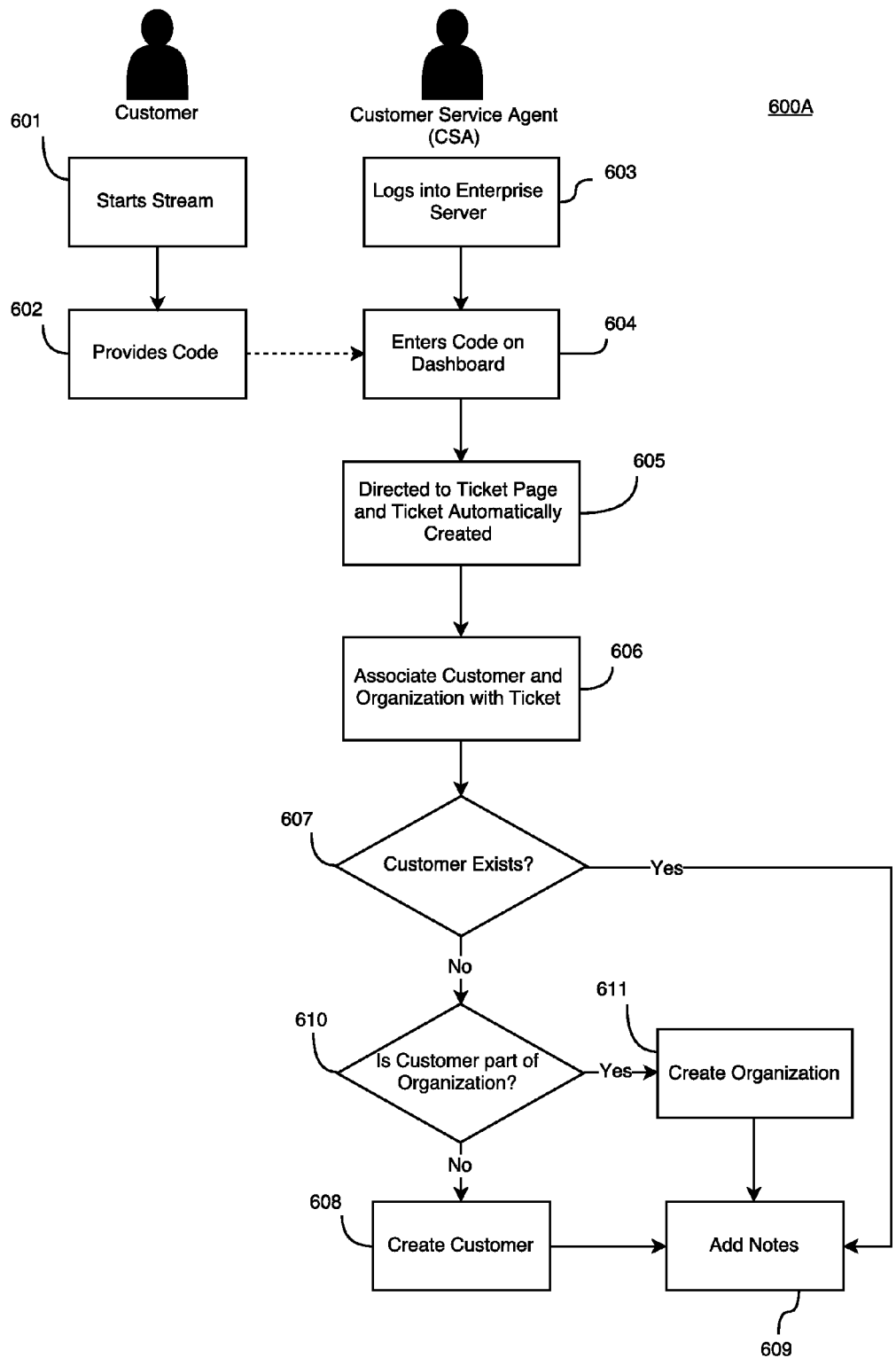
FIG. 6A is a workflow chart of providing a customer service support from a new ticket.
Figure 6B:
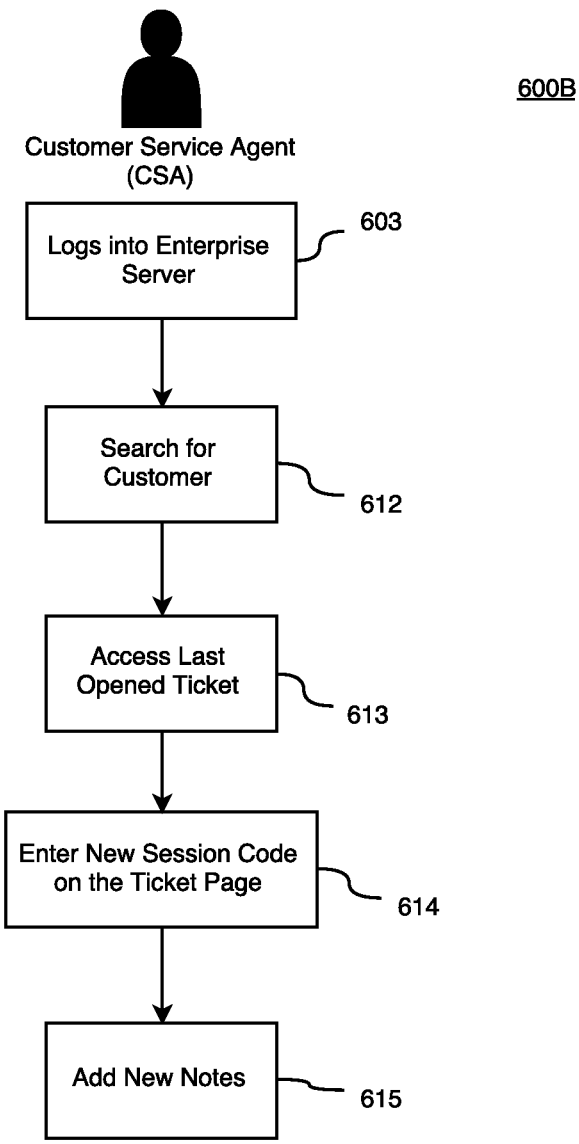
FIG. 6B is a workflow chart of providing a customer service support from an existing ticket.

Referring now to FIGS. 6A and 6B, there are shown workflow charts 600A, 600B of providing a customer service support from a new ticket and from an existing ticket, respectively. The method steps disclosed in the charts 600A, 600B are applicable in both an enterprise and CRM environments. In order to provide customer service from a new ticket, a customer must first contact a CSA. The CSA can then log into an enterprise server or a CRM account 603 if he or she is not logged in already. As the CSA logs into his or her account, the CSA instructs the customer to download the present application if the customer has not already done so. If the customer needs to download the application onto his or her mobile device, he or she can do so without hanging up the call.

Using the mobile application, the customer can begin streaming a real-time video 601. To connect, the customer provides a unique streaming identifier or a code 602 and the CSA enters the code onto the dashboard 604. Once the code is entered and validated, the CSA is directed to a ticket page and a ticket associated with the call or the stream is automatically created 605. It is contemplated that the ticket comprises a reference number. Once the ticket is created, the CSA can associate the customer and/or organization with the ticket 606.

If the customer is an existing customer 607, the CSA can continue with the call and add notes 609 as necessary. If the customer is a new customer and the customer does not exist in the database 607, the CSA must add the customer to the database before proceeding. If the customer is part of an organization 610, the CSA can create the organization to which the customer belongs to 611. If the customer is an individual and/or not a part of an organization, the CSA can add the customer as an individual 608. After the customer is added to the system, the CSA can add notes 609 to the call and watch real-time video feed inside the enterprise system UI or CRM system UI.

If the customer is an existing customer and received a ticket and/or a reference number from a previous call, or if the customer was disconnected from a previous call, the CSA can search for the customer or the customer account number 612 and access the last opened ticket 613 to access any notes or videos relating to the previous call. Any search terms may be autocompleted. Thereafter, the CSA can enter a new session code on the ticket page 614 to indicate that the instant call is a continuation of a previous call. In this way, the same ticket can be used for multiple calls so long as the calls pertain to the same matter. Once the new session code is entered, the CSA can add new notes 615.

It is contemplated that notes comprise summary of the interaction between the visual stream provider, i.e., the customer, and the viewer, i.e., the CSA, which include bookmarked locations of the video stream, markings, sketches, drawings, highlights, and the like. In one embodiment, a specific frame in a video may be bookmarked. The real-time video can be bookmarked live from the mobile device without halting the video streaming using a button click, a tap, or a slide phone function, or within the replay mode through the portal. Each bookmark identifies the frame at the specific time. Each bookmarked frame can be extracted into an image capture and the bookmarked images can be selected to produce a snapshot image report. Each bookmarked timestamp, image, or snapshot can be annotated in order to provide a short name, phrase, or a sentence that can be browsed quickly.

In another embodiment, the viewer, i.e., the CSA, can pause a live video, and sketch or draw directly on the video to explain or identify an item of interest to the visual stream provider, i.e., the customer, during a live transmission without disconnecting the communication. Once the drawing is completed, it is sent over to the visual stream provider, i.e., the customer, to be displayed within his or her mobile application to help with real-time guidance.

Similarly, the visual stream provider, e.g., the customer, can draw directly on a mobile device over the live video capture in order to point out certain parts of the video or to direct the viewer's attention to a problem that needs to be addressed. Once the drawing is completed it is sent over to the viewer, i.e., the agent or a dispatch user, to be displayed within the enterprise portal. Once the customer interaction is completed or the customer disconnects, the drawn pictures are saved can be accessed and viewed within the portal at a later time.

If a customer wishes to share a new or updated real-time video during the session, he or she must provide a new unique code for the CSA to enter. Upon the end of the transmission, the video file and all of the notes as well as the ticket information are saved and stored in a database. The present invention is configured to identify a streaming connection without having to register the device or a mobile application through a login. This feature is particularly advantageous because traditional methods require a user to provide login credentials to provide authentication and authorization when using mobile devices to deliver the video without registering the visual stream provider, i.e., the customer. To identify the real-time visual streaming provider and the device he or she is using, the mobile application communicates with a server in order to allocate a unique stream identifier for each real-time video stream that is started.

It is noted that the unique stream identifier is not simply a unique identification of the mobile device that is streaming the content, but also the actual unique identification of the actual stream that is generated; even for multiple streams started on the same mobile device. Additionally, it is noted that the unique stream identifier is generated when there is a network connection. In this regard, when there is no network connection, the user must wait until the network connection is established or reestablished before generating the unique stream identifier.

The unique stream identifier comprises numbers, letters, characters, or a combination thereof. The mobile application user can share the unique stream identifier with one or more viewers via a text, email, hyperlink, verbally, and other methods. If the unique stream identifier is shared digitally, i.e., via a text, email, or hyperlink, a unique sharing message is generated for each real-time stream per a viewing recipient. The viewer can enter the unique stream identifier to gain access to the stream and connect to the visual stream. When the unique stream identifier from a single streaming source is passed to numerous parties, multiple parties can gain simultaneous access to the real-time stream to view the video. In this way, the present invention provides a way for unlimited viewers to access the real-time stream.

In some embodiments, the unique stream identifier is encoded to provide a high level of security through obfuscation of the stream URL link. Additionally, it is contemplated that the stream identifier does not have to be completely unique in a sense that the stream identifier is only unique for a period of time to uniquely identify a stream within all the streams that are broadcasting at the given period of time. In this regard, the unique stream identifier is only unique during a snapshot in time; and the identifier can be reused and mapped to represent other streams at later time.

In another embodiment, the present invention comprises a public stream identifier. The public stream identifier does not change so that the public stream identifier is assigned to a particular video stream at all times. In such embodiment, the mobile application supplying the real-time streaming is configured to receive a notification each time a viewer joins to watch the stream. Optionally, each viewer may be required to provide a pin, a password, or a secondary code to view the stream after connecting to the stream by entering the public stream identifier. Alternatively, the visual stream provider may be prompted to permit or accept each viewer to watch the stream as each viewer is connected to the stream. In some embodiments, the present system may be configured so as to automatically grant certain group of viewers, e.g., viewers belonging to a permitted organization, institution, etc., to watch the stream.

In this regard, both the live and prerecorded real-time stream can be shared to unlimited number of simultaneous viewers within the organization for internal access as well as from the outside of the organization for external access. Sharing internally is done within the same department, such as customer service, in order to enroll the help of a senior support specialist for issue resolution. It can also be used for education and training purposes. Sharing externally, on the other hand, is done to share a video with a customer or another engineer or supervisor in the field.

A unique auditing process identifies all internal or external viewing parties that are accessing the live video, as well as recorded video. This unique auditing process is applied specifically for organizations with heightened levels of security and accountability, such as medical HIPAA regulation environments, high security data center facilities, and critical power electric utility infrastructure environments as some of the most prominent examples. The auditing process creates records to identify: a video being accessed, a time of access, an IP address of the viewer, a viewer ID if available, cookies, search queries, data identifying the type of interaction with the video, the time of every interaction with the video, viewing time, a time of egress, method of sharing the video.

In yet another embodiment, the present invention enables stream identification through a customer's account information so as to eliminate the need for a unique stream identifier or a public stream identifier. Stream identification through a customer's account information is accomplished by identifying recurring customers when a CSA initially associates a customer with a customer service organization on a customer management enterprise portal. During this interaction, when the customer service help record or help ticket is logged, customer's information can be pushed into the mobile device in a form of a unique secured token that uniquely identifies the user. If the customer deletes the mobile application and reinstalls it, the next subsequent exchange would reload the information back to the mobile device from the server to recover the previous state that customer maintained. In this way, the present invention uses contextual knowledge from the customer service workflow to uniquely identify the customer.

When the customer is utilizing a brand-agnostic application to deliver the real-time visual feed, records of customer service calls to numerous organizations are pushed into the mobile application, but will also create a record of all user based activities coming from the same mobile device within the enterprise server.

This exclusive functionality allows the customer's stream to be identifiable without the need of providing unique stream identification to the customer service support agent, essentially creating a connection to the customer's visual stream without a code or a key. Instead, the customer service support agent, during the interaction, is able to see whether or not the person communicating is currently supplying a real-time visual stream and is able to access it without a unique identifier.

Figure 7:
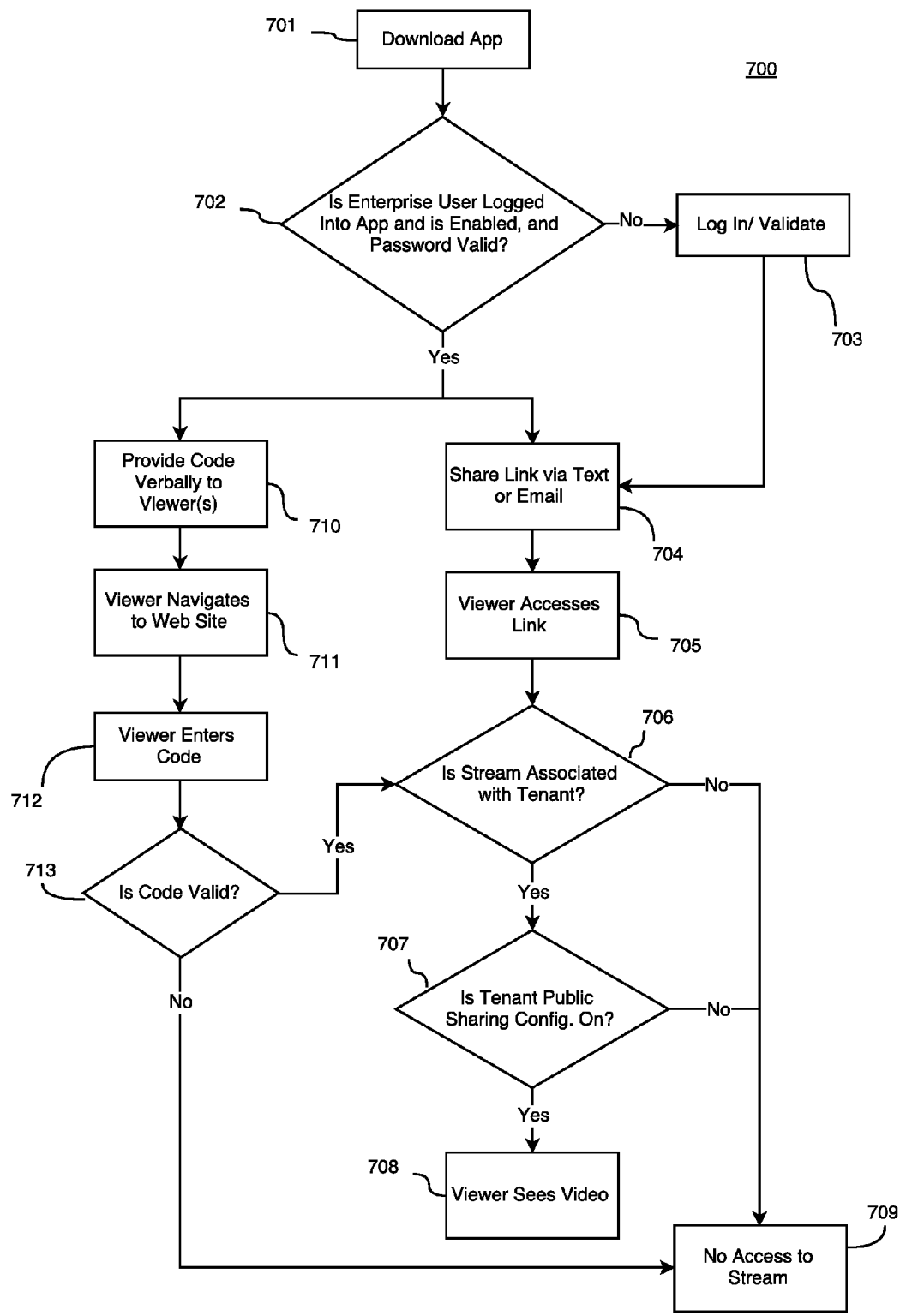
FIG. 7 is a workflow chart of the public stream sharing using text or email and voice.

Referring now to FIG. 7, there is shown a workflow chart 700 of the public stream sharing method using text or email and voice. To share a video, a mobile device user downloads the application to his or her mobile device 701. Once the application is downloaded, the user logs into the application. If the user is not properly logged into the application, the application is not enabled, and/or the password is invalid 702, the user must attempt to log into the application again and log in or validate his or her account 703 before proceeding.

Once logged in, the user can share a link to the live stream with a viewer by copying and pasting the link in a text, e.g., SMS, or email and sending it to the viewer 704. When the viewer clicks on the link 705, the viewer is directed to the website and is prompted to login to the system, if the viewer is not already logged in. Once logged in, the system determines whether the link contains a valid code. If the link contains a valid code, a new ticket is automatically created. Thereafter, the system determines whether the stream is associated with the tenant 706.

If the stream is associated with the tenant, the system can determine whether the tenant public sharing configuration is on 707. If the tenant public sharing configuration is on, the viewer can see the live video stream 708 while maintaining communication with the user over a phone or a telephone hotline. The real-time video is displayed on the screen in a browser and is associated with the customer or field assessment record, ticket, or claim file. As the name suggests, the real-time video streaming is viewed live. It is contemplated, however, that the streaming is also automatically recorded during transmission and can be replayed at a later time by either the visual stream provider or the viewer. If the stream is not associated with the tenant and/or the tenant public sharing configuration is off, the viewer does not have access to the stream 709.

In another embodiment, the user can share code to the video live stream verbally with the viewer 710. It is contemplated that the user is already in voice communication with the viewer so that the viewer can receive the code over the phone and navigate to the web site 711 during the call. Once on the web site, the viewer can enter the code 712 into a customer ticketing, help desk, or CRM system. If the code is valid, the system automatically generates a new ticket and determines whether the stream is associated with the tenant 706. If the stream is associated with the tenant, the system can determine whether the tenant public sharing configuration is on 707. If the tenant public sharing configuration is on, the viewer can see the live video stream 708. If the stream is not associated with the tenant and/or the tenant public sharing configuration is off, the viewer does not have access to the stream 709.

Figure 8:
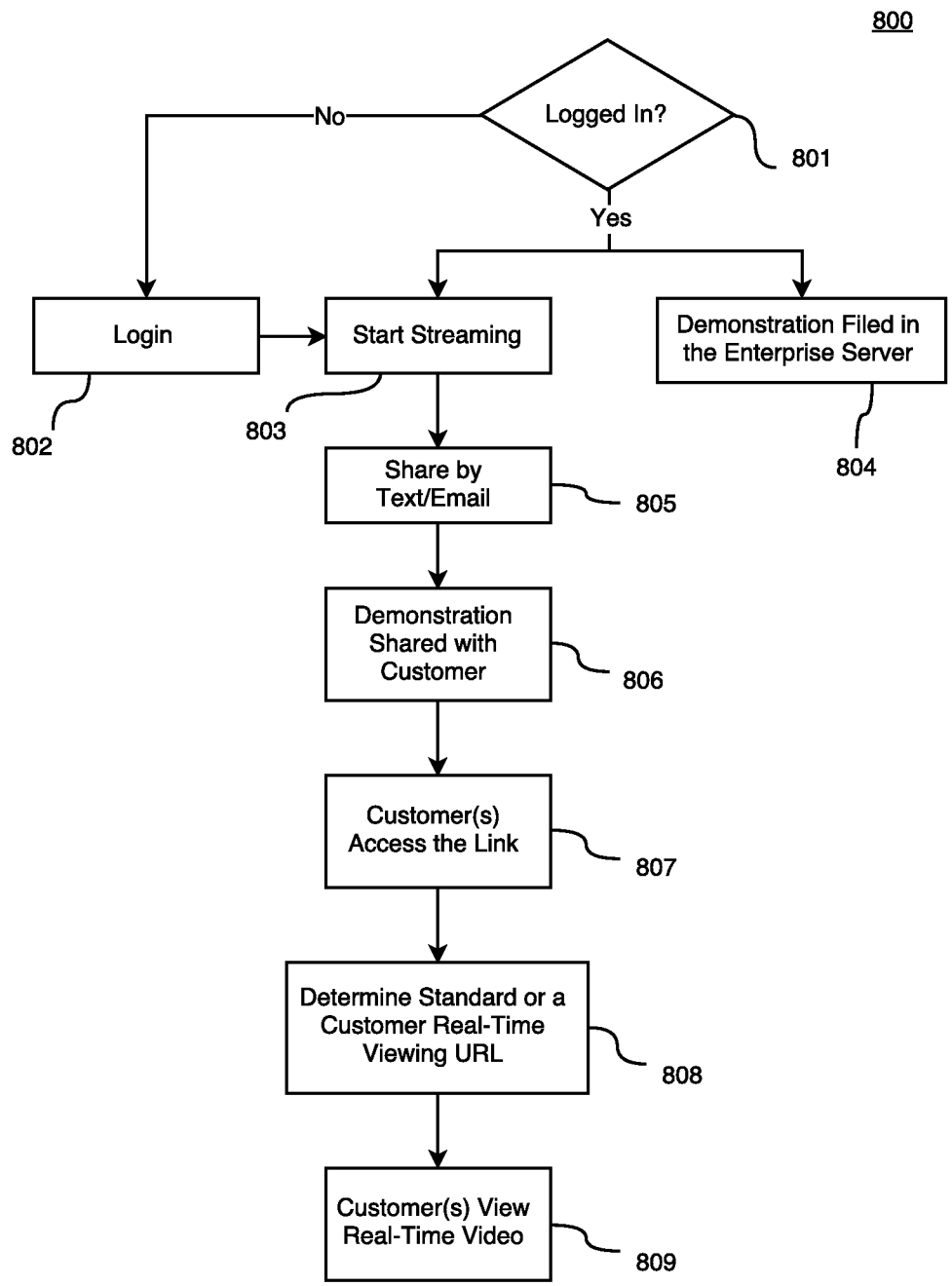
FIG. 8 is a workflow chart showing the process of sharing video from a mobile device.

Referring now to FIG. 8, there is shown a workflow chart 800 showing the process of sharing video from a mobile device. In the illustrated embodiment, a customer can receive live video stream from a CSA via a widget that is embedded on a website. More specifically, the widget may be embedded on a website for an online retailer. This enables workflows where the CSA is able to stream the live video data externally to the customer through the retailer's own portal, i.e., the retailer's website, while simultaneously being able to speak with the customer over the phone.

In operation, a customer can contact a CSA over the phone to request information or assistance. During the call, the customer logs into system 802 if he or she is not already logged into the system 801. It is contemplated that the customer can log into the system 802 in a conventional manner, e.g., by entering a username and password. Once the CSA is connected to the customer over the phone, the CSA can start streaming a live video feed 803. Concurrently, the streaming or the demonstration is filed in the enterprise server 804.

The live video feed may include views of an item in question or tutorial on installation, repair, or use. Once the streaming begins, the CSA can provide a keyword or a code to the customer via a link in a text or an email 805 to share the demonstration 806. The customer can access the link 807 by clicking on the link. Alternatively, the customer can enter the keyword or code in a website video viewing widget. The system then determines whether standard or a customer real-time viewing URL is used 808. The customer can then see the live video provided by CSA on the website 809.

Figure 9:
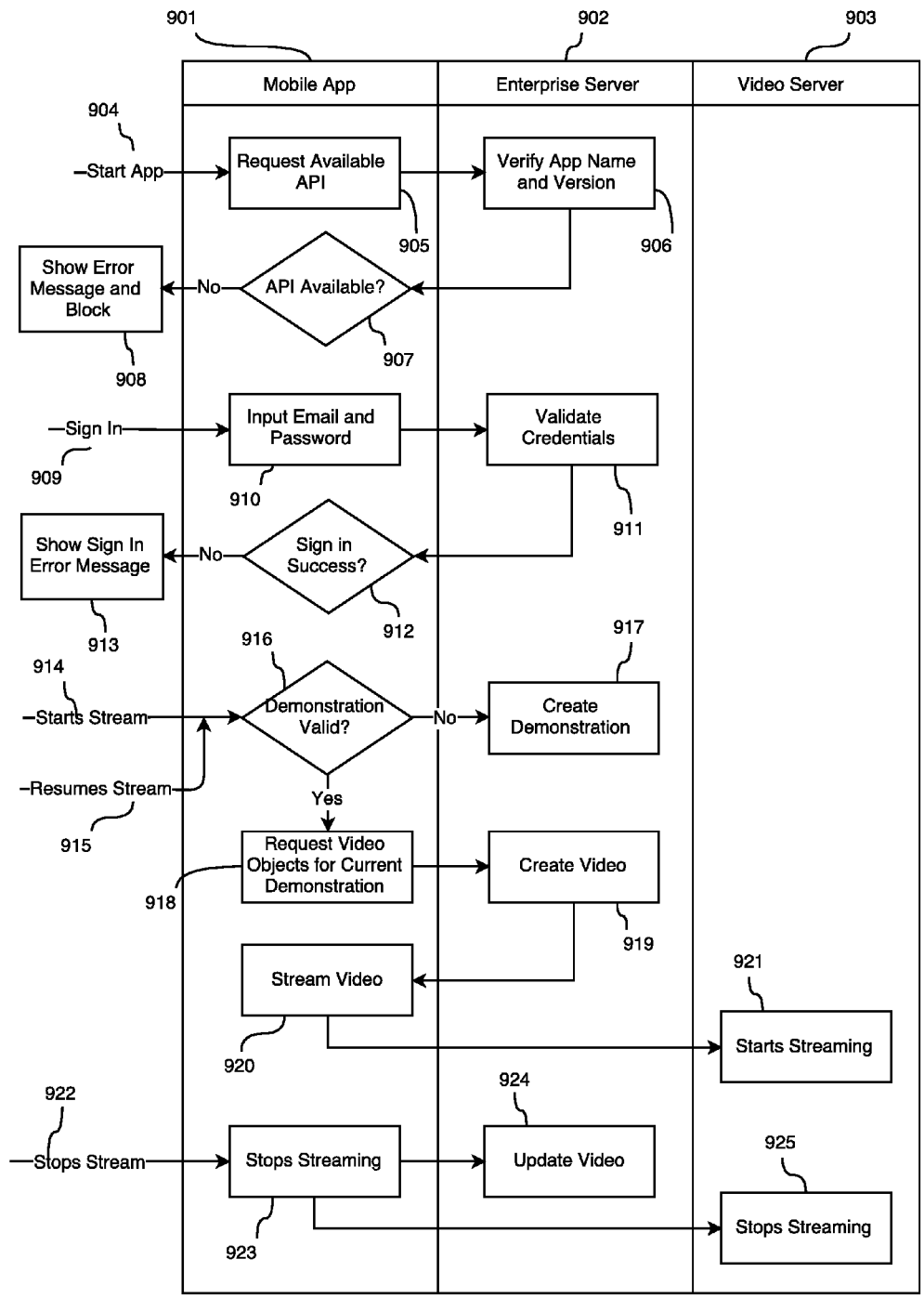
FIG. 9 is a workflow chart of the detailed streaming process.

Referring now to FIG. 9, there is shown a workflow chart of the detailed streaming process. To start the application 904, the mobile application 901 is configured to request available API 905 to the enterprise server 902, which verifies the application name and version 906 of the application that is activated. Once the application has been verified, the mobile application 901 determines whether API is available 907. If API is not available, the mobile application displays an error message 908.

If the API is available, the user can sign in 909 by inputting email or username and password 901 within the mobile application. The enterprise server 902 then validates the user's credentials 911 and the mobile application 912 can determine that the sign in is successful. If the sign in is not successful, the application can show a sign in error and prompt the user to re-enter the email or username and password.

If the user signs in successfully, he or she can start streaming real-time video 914. If the demonstration is not valid, the enterprise server 902 creates a demonstration 917. If the demonstration is valid, the mobile application requests video objects for the current demonstration 918 and the enterprise server 902 creates a video 919, which is streamed 920 via the mobile application 901 and accessible via the video server 903.

To stop the stream 922, the mobile application commands to stop streaming 923. The enterprise server 902 can then update an existing video with the most current video 924. Additionally, the request to stop streaming the video 923 is received via the video server 903 and stops the streaming 925.

Figure 10A:
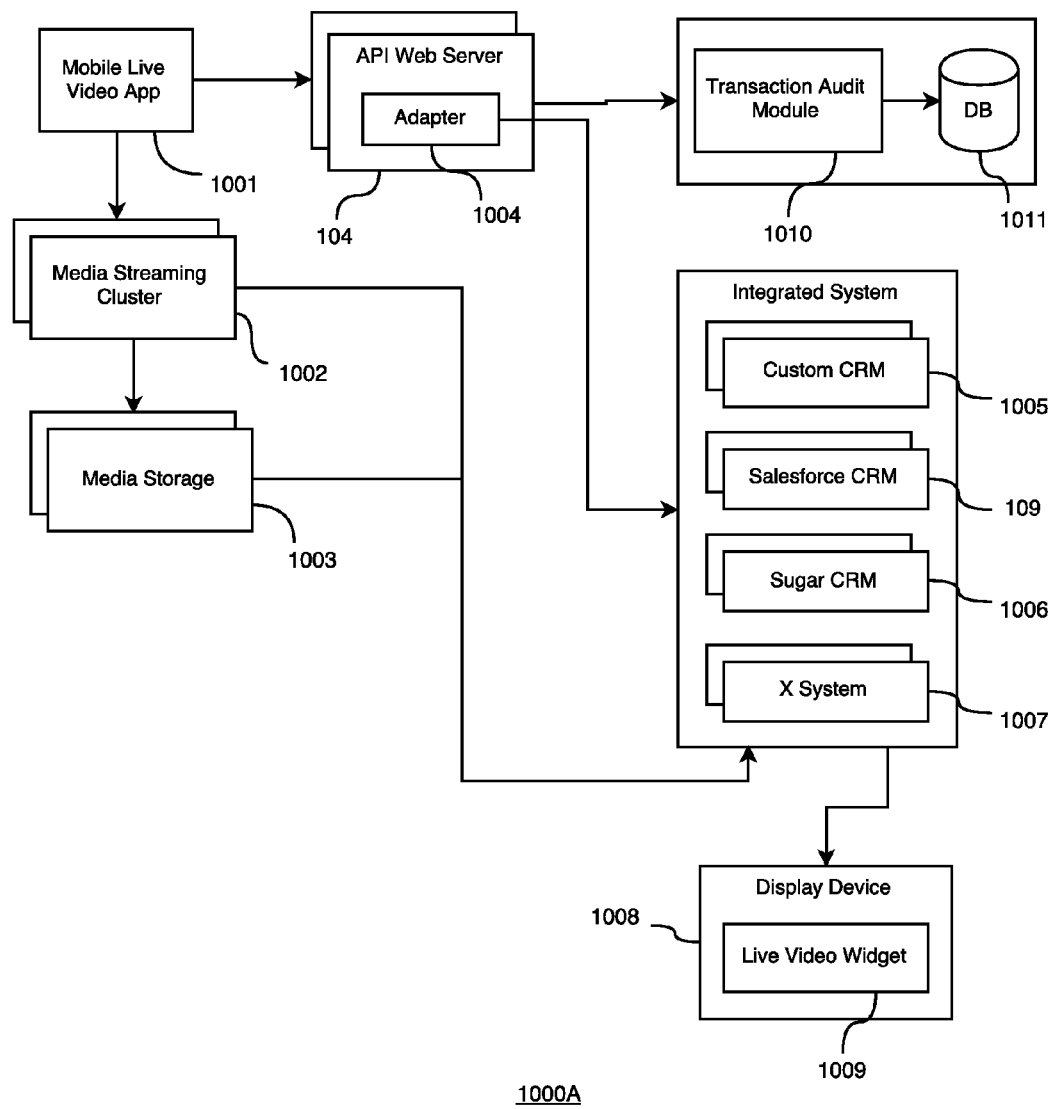
FIG. 10A is a block diagram of the end-to-end auditing connectivity
Figure 10B:
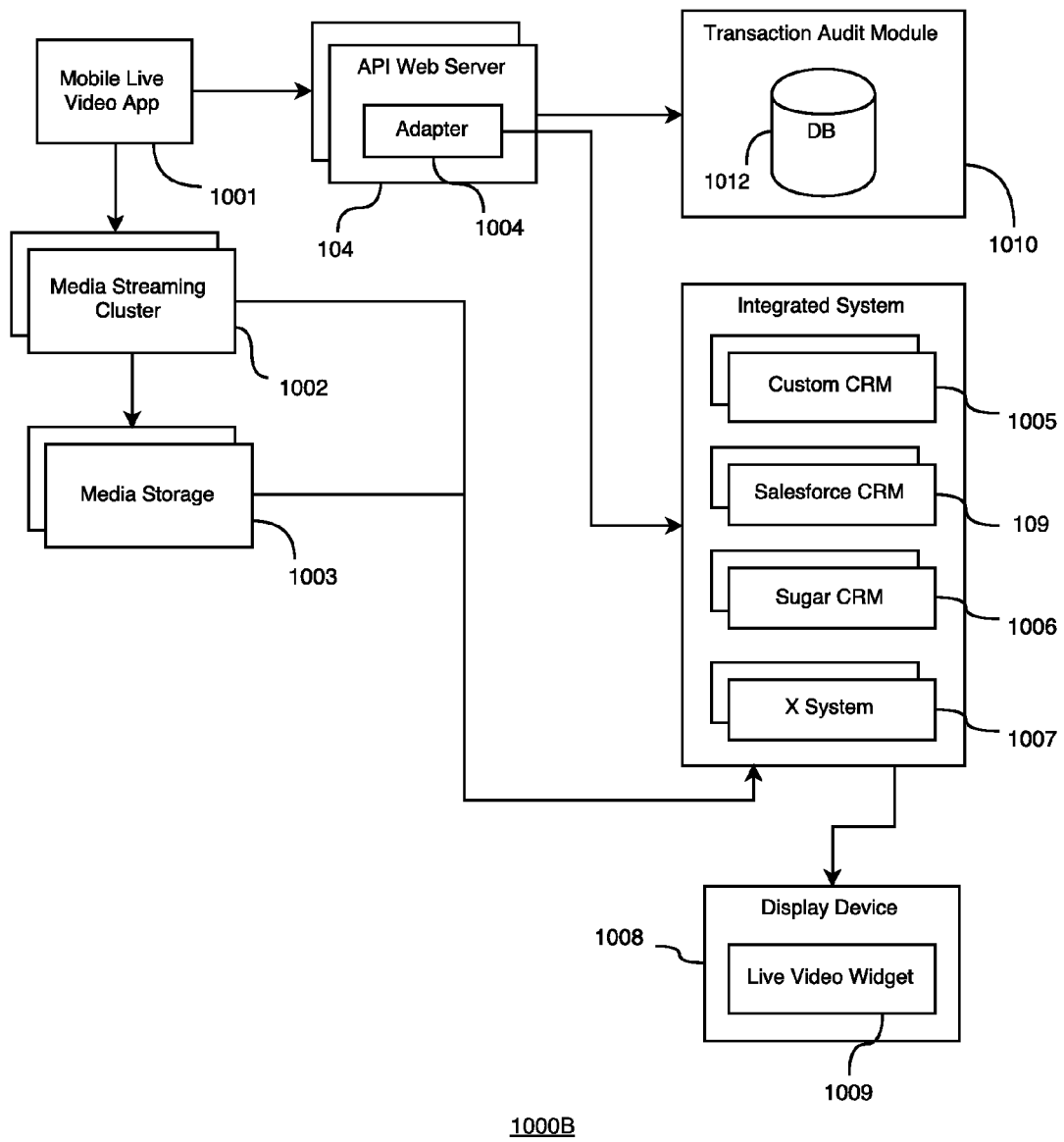
FIG. 10B is a block diagram of the end-to-end redundancy connectivity.

Referring now to FIGS. 10A and 10B, there are shown block diagrams of the end-to-end auditing connectivity and the redundancy connectivity, respectively. The systems 1000A, 1000B comprise a mobile live video application 1001 in communication with a media streaming cluster 1002 and an API web server 104, wherein the API web server 104 comprises an adapter 1004. The media streaming cluster 1002 transmits data to the media storage 1003. The media streaming cluster 1002 and the media storage 1003 further transmits data to an integrated system. In this regard, an enterprise portal is designed to integrate with other systems so that these systems can embed and access real-time videos and prerecorded videos within another portal.

In one embodiment, the API web server 104 is in communication with a server having a transaction audit module 1010 and a database 1011, as shown in FIG. 10A. In another embodiment, the API web server 104 is in direct communication with the transaction audit module 1010 having a database 1012 therein, as shown in FIG. 10B. The adapter 1004 communicates with the integrated system that comprises a custom CRM 1005, Salesforce CRM 109, Sugar CRM 1006, and another system 1007. The integrated system communicates with a display device 1008, wherein the display device 1008 is configured to display a live video widget 1009. Non-limiting examples of the display device 1008 include monitors or screens on an electronic device.

Figure 11:
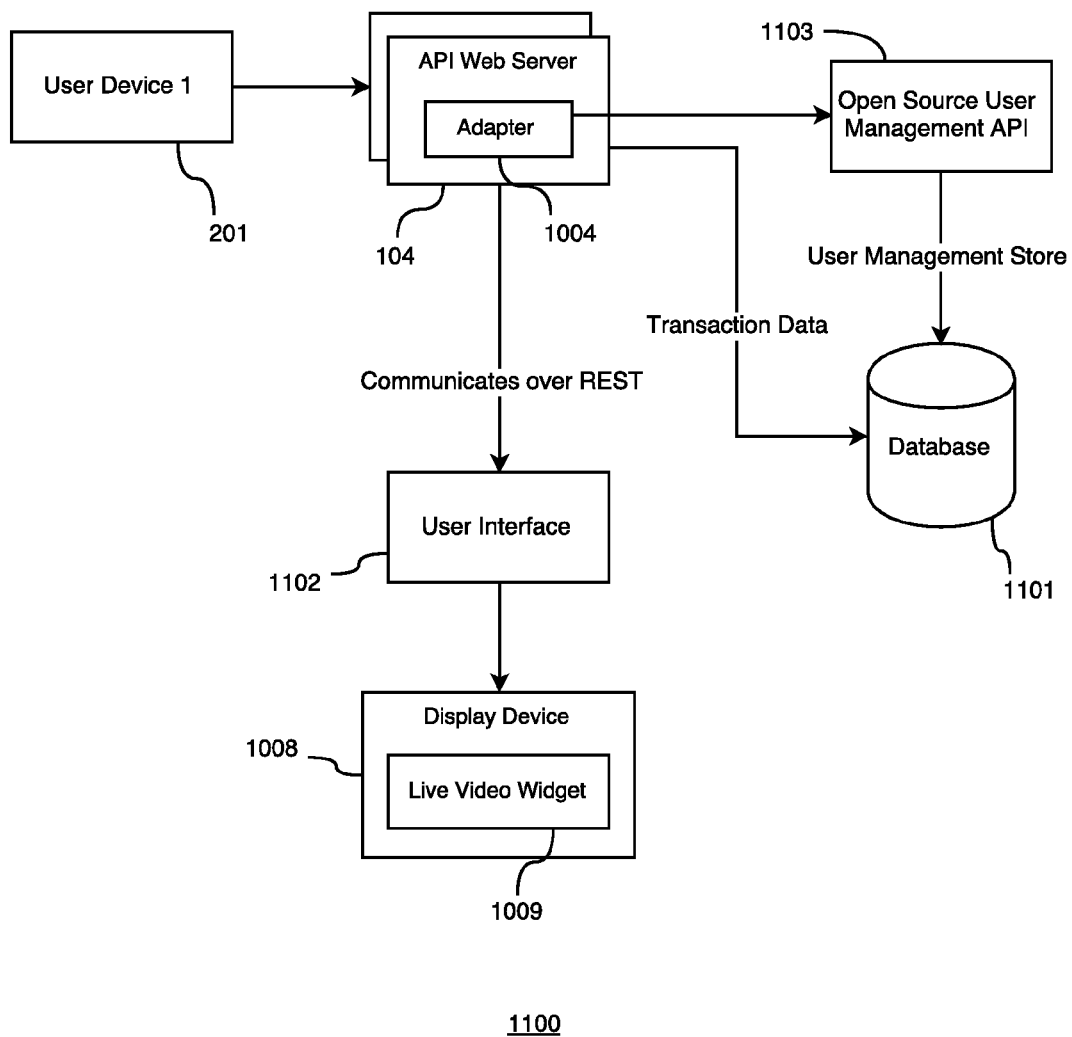
FIG. 11 is a diagram of the API connectivity for third party help desk and CRM applications.

Referring now to FIG. 11, there is shown a diagram 1100 of the API connectivity for third party help desk and CRM applications. The first user device 201 is in communication with at least one API web server 104 having an adapter therein. The adapter 1004 communicates with an open source user management API 1103, which communicates with a database 1101 via a user management store. The API web server 104 transmits transaction data to the database 1101. The API web server 104 also communicates with a user interface 1102 over REST. The user interface 1102 is transmitted to the display device 1008, which provides access to the live video widget 1009.

Scenarios for Operation

The following non-limiting examples of concrete use cases are presented from several different industries for the purposes of explaining the present invention. The business process, however, can be applied to many other uses, both internally to the organization between employees, as well as externally between a customer and the business.

Scenario 1: A homeowner's dishwasher broke down. The homeowner calls the manufacturer for support but while discussing the issue with the customer service support agent it becomes obvious that the agent does not understand exactly what broke in the unit. The customer service support agent instructs the homeowner to download the real-time streaming application onto his tablet. Once the application is installed, the homeowner delivers a live video stream to the agent so the agent can see precisely what the customer is talking about. The agent now can see the issue and knows exactly what parts need to be ordered and sends it to the satisfied customer.

Scenario 2: An insurance customer is involved in an automobile accident. The customer calls the claims and customer support center and notifies the company of the accident. The claims specialist records the information from the customer and sends the customer an SMS (text message) to his mobile phone with a link to the mobile application. The customer clicks on the link and installs the application. Once the application is installed, the customer relays the code to the claims specialist and begins sending the live video stream so that the claims specialist can view the accident scene before any vehicles are moved out of position.

Scenario 3: A homeowner's property has been devastated by severe weather. He calls his insurance company and notifies the company of the damage. The claims specialist records the information from the customer and sends the customer an email with a link to the mobile application. The customer clicks on the link and installs the application on his mobile device. Once the application has been installed, the customer relays the code to the claims specialist and begins sending the live video stream so that the claims specialist can view the damage to the property.

Scenario 4: An electrical contractor is working in the field and comes across what he believes to be the issue he has been trying to track down; he needs an engineer from the local electric company to confirm his findings as being accurate, however. He calls the electric company but they are unable to send any field engineers to his location. Instead, the electric company representative sends an SMS with the mobile application link in it to the electrician and transfers his call to the engineering department. The electrician installs the application on his mobile phone and gives the engineer on the line a unique streaming code and begins streaming live video to the engineer while they discuss the issue. The engineer confirms the electrician's finding and the electrician makes the necessary repairs.

Scenario 5: A customer's printer has a paper jam and the customer is unable to clear it. She calls the customer service number and the agent gives her the instructions to install and start the mobile application on her phone. She starts the application and delivers a real-time video to the agent; enabling the agent to assist her more efficiently in resolving the issue. Following the agent's instructions, she is able to remove the paper jam and get the printer back online quickly and easily.

Scenario 6: A customer's printer has a paper jam and the customer does not know how to clear it and does not have the time at the moment to fix it. With a single click she can describe and capture the issue—the application automatically creates and queues a visual support ticket in the customer service support system for offline resolution. This recording can be replayed to other customer service representatives so that the customer does not have to repeatedly explain to different customer service agents. Once the recording is reviewed, a customer support can contact the customer and help clear the paper jam.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A computer-implemented method for providing real-time visual and audio communication, comprising executing on a processor the steps of:
    establishing a voice communication channel between a first user device and a second user device;
    providing a visual stream via a mobile application that is installed on said first user device, wherein said mobile application is configured to establish a video communication channel to transmit said visual stream from said first user device to said second user device;
    generating an identifier for said visual stream via said mobile application of said first user device;
    entering said identifier in a user interface of said second user device; and
    accessing said visual stream via said second user device while maintaining said voice communications channel with said first user device by combining said voice communication channel and said video communication channel.

2. The computer-implemented method of claim 1, wherein said mobile application is further configured to reroute said voice communications channel to create a uniform communication channel having said voice communication channel and said video communication channel.

3. The computer-implemented method of claim 1, wherein said identifier comprises a unique stream identifier that identifies said visual stream, further wherein said unique stream identifier is unique only during a snapshot in time such that said unique stream identifier can be used to identify a second visual stream during a second snapshot in time.

4. The computer-implemented method of claim 1, wherein said identifier comprises a public stream identifier, further wherein said public stream identifier is constant.

5. The computer-implemented method of claim 4, further comprising the step of:
    validating said second user device before permitting said second user device to access said visual stream.

6. The computer-implemented method of claim 1, further comprising the step of:
    transmitting said identifier from said first user device to said second user device via messaging.

7. The computer-implemented method of claim 1, further comprising the steps of:
    creating a ticket that is associated with said visual stream and a visual stream provider of said visual stream, wherein said ticket comprises a reference number.

8. The computer-implemented method of claim 1, further comprising the steps of:
    determining a GPS location of said first user device, wherein said first user device is a GPS-enabled device; and displaying said GPS location of said first user device on a map, wherein said map is displayed on said second user device.

9. The computer-implemented method of claim 1, further comprising the steps of:
  transcribing speech within said visual stream into text;
  locating at least one trigger word within said text to identify text occurrence;
  recording a timestamp of said visual stream for each of said text occurrence, whereby recording said timestamp provides a still image of said visual stream; and
  producing said still image that correspond to said at least one trigger word to associate said still image with said at least one trigger word.

10. The computer-implemented method of claim 1, further comprising the steps of:
  bookmarking a specific frame in said visual stream to produce a still image capture; and
  extracting all of said still image capture to produce an image report.

11. The computer-implemented method of claim 1, further comprising the steps of:
  drawing on an image of said visual stream to create a picture that is superposed over said image; and
  transmitting said picture that is superposed over said image.

12. The computer-implemented method of claim 1, wherein said voice communications channel is prioritized over said video communication channel.

13. The computer-implemented method of claim 1, wherein providing said visual stream comprises the steps of:
  detecting a type of video artifact transfer;
  if video capturing functionality is activated:
  recording video on said first user device;
  uploading said video by chunk-based transfer into a cloud storage; and
  transmitting said video to said second user device.

14. The computer-implemented method of claim 1, wherein providing said visual stream comprises the steps of:
  detecting a type of video artifact transfer;
  if live streaming is enabled:
  supplying a high-definition version of a streaming video to said first user device and said second user device concurrently;
  synchronizing and uploading said streaming video to a cloud storage; and
  deleting said streaming video from said first user device.

15. The computer-implemented method of claim 1, wherein:
  if said video communication channel cannot be established, recording, via said mobile application, said visual stream to create a visual voicemail and transmit said visual voicemail to said second user device to be listed in a queue;
  providing an alert when said visual voicemail is listed in said queue; and
  reordering said visual voicemail based on priority.

16. The computer-implemented method of claim 15, further comprising the steps of:
  determining a GPS location of said first user device, wherein said first user device is a GPS-enabled device; and
  displaying said GPS location of said first user device on a map, wherein said map is displayed on said second user device.

17. The computer-implemented method of claim 15, further comprising the steps of:
  transcribing speech within said visual stream into text;
  locating at least one trigger word within said text to identify text occurrence;
  recording a timestamp of said visual stream for each of said text occurrence, whereby recording said timestamp provides a still image of said visual stream; and
  producing said still image that correspond to said at least one trigger word to associate said still image with said at least one trigger word.

18. The computer-implemented method of claim 15, further comprising the steps of:
  bookmarking a specific frame in said visual stream to produce a still image capture; and extracting all of said still image capture to produce an image report.

19. A computer-implemented method for providing real-time visual and audio communication, comprising executing on a processor the steps of:
  establishing a voice communication channel between a first user device and a second user device;
  providing a visual stream via said second user device;
  transmitting an access code from said second user device to said first user device;
  inputting said access code in a video viewing widget on a website via said first user device, wherein said video viewing widget is configured to establish a video communication channel between said first user device and said second user device; and
  accessing said visual stream via said first user device by combining said voice communication channel and said video communication channel.

20. The computer-implemented method of claim 19, further comprising the steps of:
  associating a user account information to an organization via a user management enterprise portal;
  logging a ticket that is associated with said user account information;
  pushing said user account information to said first user device to create a secure token that identifies user of said first user device; and
  permitting said first user device to access to said visual stream.

* * * * *